US011636318B2

(12) United States Patent
Paul et al.

(10) Patent No.: US 11,636,318 B2
(45) Date of Patent: Apr. 25, 2023

(54) CONTEXT-BASED SEARCH USING SPIKE WAVES IN SPIKING NEURAL NETWORKS

(71) Applicant: INTEL CORPORATION, Santa Clara, CA (US)

(72) Inventors: Arnab Paul, Hillsboro, OR (US); Narayan Srinivasa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 527 days.

(21) Appl. No.: 16/647,814

(22) PCT Filed: Dec. 15, 2017

(86) PCT No.: PCT/US2017/066781
§ 371 (c)(1),
(2) Date: Mar. 16, 2020

(87) PCT Pub. No.: WO2019/117958
PCT Pub. Date: Jun. 20, 2019

(65) Prior Publication Data
US 2020/0272884 A1 Aug. 27, 2020

(51) Int. Cl.
*G06N 3/04* (2006.01)
*G06N 3/049* (2023.01)
(52) U.S. Cl.
CPC .................. *G06N 3/049* (2013.01)
(58) Field of Classification Search
CPC .................................................. G06N 3/049
See application file for complete search history.

(56) References Cited

U.S. PATENT DOCUMENTS 7,496,548 B1 * 2/2009 Ershov ............... G06F 40/30
706/31
8,229,948 B1 7/2012 Ershov
(Continued)

FOREIGN PATENT DOCUMENTS

EP 2602749 A1 * 6/2013 ............. G06N 3/049
WO WO-2006000103 A1 * 1/2006 ........... G06K 9/4628

OTHER PUBLICATIONS

International Preliminary Report on Patentability from PCT/US2017/066781 dated Jun. 25, 2020, 11 pgs.
(Continued)

*Primary Examiner* — Caroline H Jahnige
(74) *Attorney, Agent, or Firm* — Essential Patents Group, LLP.

(57) ABSTRACT

Techniques and mechanisms for servicing a search query using a spiking neural network. In an embodiment, a spiking neural network receives an indication of a first context of the search query, wherein a set of nodes of the spiking neural network each correspond to a respective entry of a repository. One or more nodes of the set of nodes are each excited to provide a respective cyclical response based on the first context, wherein a first cyclical response is by a first node. Due at least in part to a coupling of the excited nodes, a perturbance signal, based on a second context of the search query, results in a change of the first resonance response relative to one or more other resonance responses. In another embodiment, data corresponding to the first node is selected, based on the change, as an at least partial result of the search query.

19 Claims, 7 Drawing Sheets

(56) References Cited

U.S. PATENT DOCUMENTS

| | | | |
|---|---|---|---|
| 9,020,870 | B1 | 4/2015 | Daily et al. |
| 2009/0287624 | A1 | 11/2009 | Rouat et al. |
| 2013/0103626 | A1 | 4/2013 | Hunzinger |
| 2013/0297539 | A1* | 11/2013 | Piekniewski .......... G06N 3/088 706/26 |
| 2015/0269481 | A1* | 9/2015 | Annapureddy ...... G06N 3/0481 706/21 |
| 2015/0293976 | A1 | 10/2015 | Guo et al. |
| 2018/0225562 | A1* | 8/2018 | van der Made ....... G06N 3/063 |

OTHER PUBLICATIONS

Extended European Search Report for European Patent Application No. 179346648.1, dated Feb. 8, 2022.
Dhilipan, A., et al., "Pattern recognition using Spiking Neural Networks with temporal encoding and learning", 2015 IEEE 9th International Conference on Intelligent Systems and Control (ISCO), Jan. 9, 2015.
Tarassenko, L., et al., "Neural Network Architectures for Content-Addressable Memory", IEEE Proceedings of Communications, Radar & Signal Processing, Institution of Electrical Engineers, Stevenage, GB, vol. 138, No. 1, Jan. 1, 1991.
International Search Report and Written Opinion from PCT/US2017/066781 dated Sep. 14, 2018, 14 pgs.
Ciric, R. et al., "Contextual connectivity: A framework for understanding the intrinsic dynamic architecture of large-scale functional brain networks", Nature Scientific Reports; Article No. 6537 (Jul. 2017).
Grover, L.K. "A fast quantum mechanical algorithm for database search", ACM Symposium on the Theory of Computing (1996).
Hochreiter, S. et al., "Long Short-term Memory", Neural Computation 9(8), 1735-80; Dec. 1997.
Lunqvist, M. et al., "Gamma and beta bursts underlie working memory", Neuron, Mar. 17, 2016.
Maren, S. et al., "The contextual brain: implications for fear conditioning, extinction and psychopathology", Nature Reviews, Neuroscience, May 2013.
Patel, A. et al., "Wave Algorithms: Optimal Database Search and Catalysis", AIP Conference Proceeding, pp. 261-272, retrieved from https://arxiv.org/pdf/quant-ph/0609042.pdf (2006).
Santoro, A. et al., "One-shot Learning with Memory-Augmented Neural Networks", https://arxiv.org/pdf/1605.06065.pdf (2016).
Vanrullen, R. et al., "The psychophysics of brain rhythms", Frontiers of Psychology (2011).

\* cited by examiner

CONTEXT-BASED SEARCH USING SPIKE WAVES IN SPIKING NEURAL NETWORKS

CLAIM OF PRIORITY

This Application is a National Stage Entry of, and claims priority to, PCT Application No. PCT/US17/66781, filed on 15 Dec. 2017 and titled "CONTEXT-BASED SEARCH USING SPIKE WAVES IN SPIKING NEURAL NETWORKS", which is incorporated by reference in its entirety for all purposes.

BACKGROUND

Embodiments described herein generally relate to spiking neural networks, and more particularly, but not exclusively, relate to technologies for fast context-based search using spike waves in spiking neural networks.

Spiking neural networks (or "SNNs") are increasingly being adapted to provide next-generation solutions for various applications. SNNs variously rely on signaling techniques wherein information is communicated using a time-based relationship between signal spikes. As compared to typical deep-learning architectures—such as those provided with a convolutional neural network (CNN) or a recurrent neural network (RNN)—a SNN provides an economy of communication which, in turn, allows for orders of magnitude improvement in power efficiency.

Context-aware searching is a functionality which is increasingly important for database queries, software programming/debug and other use cases. In traditional computing, searches based on long-term context awareness is limited to conventional database architectures. Long Short-Term Memory machines (LSTMs) are one type of inference engine, based on a recurrent neural network, which has begun to be used in a range of applications. A LSTM can serve as a short term memory, but can be configured to support a lookup many more time steps in the past compared to a simple recurrent network. LSTMs work well for applications where immediate contexts are important, such as language parsing, audio-processing, video prediction, etc. Moreover, LSTMs usually require that a context be present in a current sequence of an input stream—and not in some isolated signal provided by external circuitry. However, LSTMs are relatively inefficient at integrating a context that was learnt at some time in the past. As the size, variety and proliferation of databases continue to grow, there is expected to be an increasing premium placed on incremental improvements to efficient database search functionality.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide techniques and mechanisms for generating a search result based on the perturbation of a cyclical response a node (or "neuron") of a spiking neural network. Nodes of such a spiking neural network may each include or otherwise correspond to a respective entry of a repository such as a database, list or the like. To service a search query, one or more such nodes (only a subset of the nodes, for example) may be variously excited each to provide a respective cyclical response—e.g., wherein such excitation is based on a particular context of the search query. Synaptic coupling of the nodes to one another may contribute to similar frequencies, phases and/or phase precessions for some or all of the cyclical responses by one or more nodes.

In such an embodiment, one node of the one or more nodes may have its cyclical response perturbed by signaling which is based on a second context of the search query. In response to the perturbance, a characteristic of one cyclical response may be increased, at least relative to corresponding characteristics of one or more other cyclical responses by the one or more nodes. For example, a relative dampening of one or more cyclical responses may facilitate the identification of one node of the one or more nodes (and/or its corresponding repository entry) as being at least part of a result of the search query.

As used herein, "context" refers to a parameter (e.g., represented as a word or other string of characters) that serves to narrow the scope of a search query. A context may be any of various characteristics which, for example, are included in the content which is stored at (or is to be stored at) a given repository entry. Alternatively, a context may be a characteristic that, according to some other reference information, has been identified as being associated with (e.g., applicable to) such content.

By way of illustration and not limitation, a search to identify the term "sushi" from among multiple possible search items may be based on the context "Japan" and the context "food." Similarly, a search to identify "Abraham Lincoln" may be based on two or more of the contexts "United States," "president," "tall," "Emancipation Proclamation" and/or the like. A context may be an actual part of the data which is being searched for or, alternatively, may be somewhat tangentially related to such data. For the purpose of servicing a search query according to some embodiments, the association of data with a given context may be somewhat abstract and/or remote. It may be sufficient, for example, that an association of some data with a particular context has been predefined a priori by some external resource.

Certain features of various embodiments are described herein with reference to the servicing of a context-based search of a repository. In this context, "repository" is understood to refer generally to any of various types of lists, tables, databases and/or other data structures, wherein, for some multiple items of such a data structure (referred to herein as a "database entries"), each such item has been identified as corresponding to a respective one or more contexts which are available for use by a search functionality.

In some embodiments, nodes of one or more spiking neural networks may be of a Leaky Integrate-and-Fire (LIF) type—e.g., wherein, based on one or more spiking signals received at a given node j, the value of a membrane potential $v_m$ of that node j may spike and then decay over time. The spike and decay behavior of such a membrane potential $v_m$ may, for example, be according to the following:

$$\tau_m\left(\frac{dv_m}{dt}\right) \propto -(v_m - v_{rest}) + w_{ij} \cdot I_{ij} + J_b, \qquad (1)$$

where $v_{rest}$ is a resting potential toward which membrane potential $v_m$ is to settle, $\tau_m$ is a time constant for an exponential decay of membrane potential $v_m$, $w_{ij}$ is a synaptic weight of a synapse from another node i to node j, $I_{ij}$ is a spiking signal (or "spike train") communicated to node j via said synapse, and $J_b$ is a value that, for example, is based on a bias current or other signal provided to node j from some external node/source. The spiking neural network may operate based on a pre-defined threshold voltage $V_{threshold}$, wherein the node j is configured to output a signal spike in response to its membrane potential $v_m$ being greater than $V_{threshold}$.

Additionally or alternatively, updating a value of weight $w_{ij}$ over time may include changing the value from one time period (t) to a next time period (t+1) in a sequence of time periods during operation of the spiking neural network. Such changing of weight $w_{ij}$ may, for example, be according to the following:

$$w_{ij}(t+1) \propto w_{ij}(t) \cdot e^{-(t/\tau_g)} + \delta_t, \qquad (2)$$

where $\tau_g$ is the time-constant for decay of weight $w_{ij}$, and $\delta_t$ is a value based on the detection during time period t of a signal spike (or some other predefined signal spiking pattern) by a spike train communicated to node j. In one example embodiment, detection of the spike (spiking pattern) during time period t may result in $\delta_t$ being set to a binary value (e.g., "1") or otherwise set to at least some minimum threshold value which contributes to $v_m$ being greater than $V_{threshold}$. Otherwise, $\delta_t$ may be set to another binary value (e.g., "0") or otherwise set to below such a minimum threshold value.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. Such devices may be portable or stationary. In some embodiments the technologies described herein may be employed in a desktop computer, laptop computer, smart phone, tablet computer, netbook computer, notebook computer, personal digital assistant, server, combinations thereof, and the like. More generally, the technologies described herein may be employed in any of a variety of electronic devices including spiking neural network circuitry to facilitate context-based search functionality.

Figure 1:
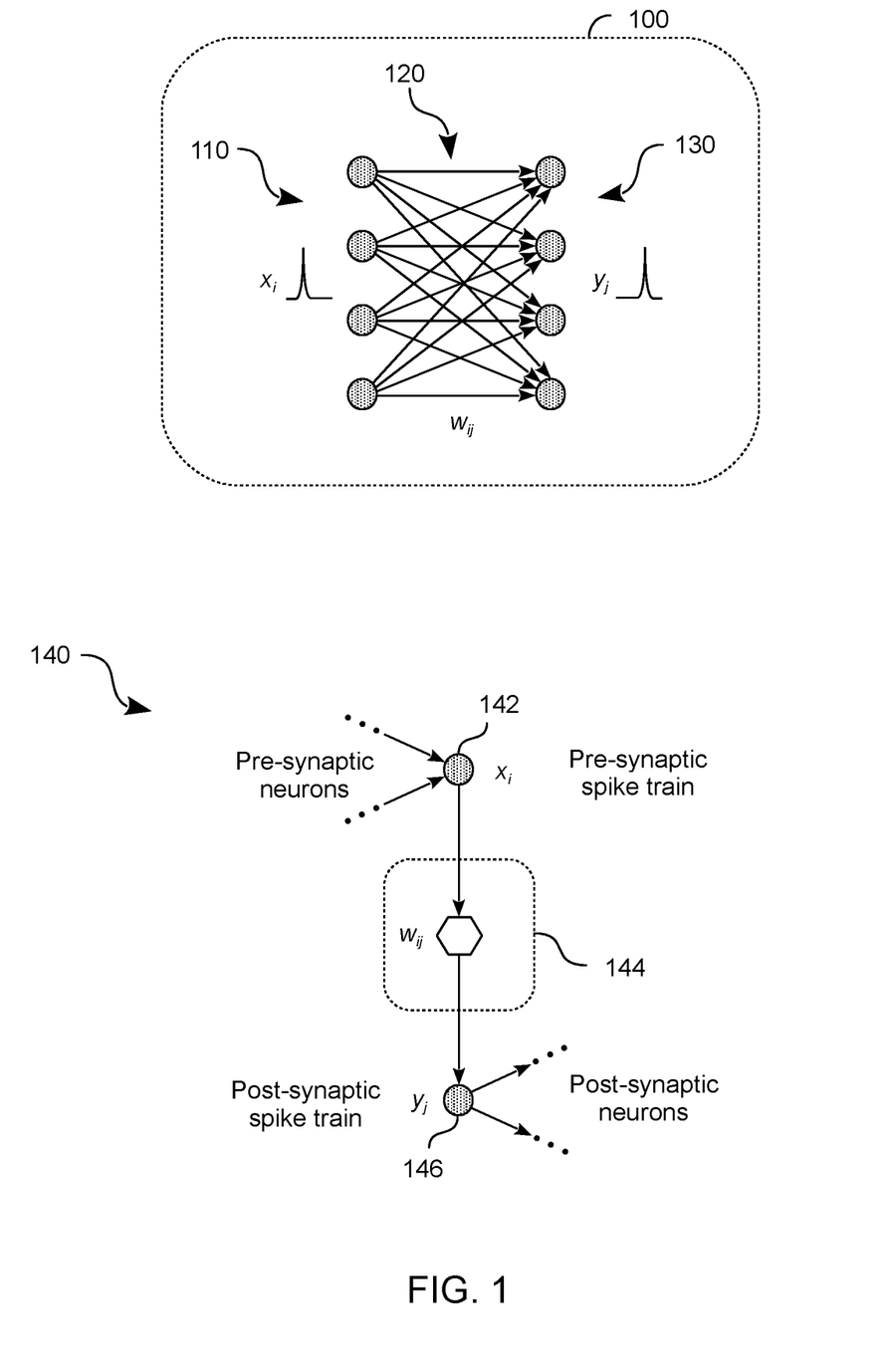
FIG. 1 shows diagrams each illustrating features of a simplified neural network according to an embodiment.

FIG. 1 illustrates an example diagram of a simplified neural network 100, providing an illustration of connections 120 between a first set of nodes 110 (e.g., neurons) and a second set of nodes 130 (e.g., neurons). Some or all of a neural network (such as the simplified neural network 100) may be organized into multiple layers—e.g., including input layers and output layers. It will be understood that the simplified neural network 100 only depicts two layers and a small number of nodes, but other forms of neural networks may include a large number of variously configured nodes, layers, connections, and pathways.

Data that is provided into the neutral network 100 may be first processed by synapses of input neurons. Interactions between the inputs, the neuron's synapses and the neuron itself govern whether an output is provided via an axon to another neuron's synapse. Modeling the synapses, neurons, axons, etc., may be accomplished in a variety of ways. In an example, neuromorphic hardware includes individual processing elements in a synthetic neuron (e.g., neurocore) and a messaging fabric to communicate outputs to other neurons. The determination of whether a particular neuron "fires" to provide data to a further connected neuron is dependent on the activation function applied by the neuron and the weight of the synaptic connection (e.g., $w_{ij}$) from neuron i (e.g., located in a layer of the first set of nodes 110) to neuron j (e.g., located in a layer of the second set of nodes 130). The input received by neuron i is depicted as value $x_i$, and the output produced from neuron j is depicted as value $y_j$. Thus, the processing conducted in a neural network is based on weighted connections, thresholds, and evaluations performed among the neurons, synapses, and other elements of the neural network.

In an example, the neural network 100 is established from a network of spiking neural network cores, with the neural network cores communicating via short packetized spike messages sent from core to core. For example, each neural network core may implement some number of primitive nonlinear temporal computing elements as neurons, so that when a neuron's activation exceeds some threshold level, it generates a spike message that is propagated to a fixed set of fanout neurons contained in destination cores. The network may distribute the spike messages to all destination neurons, and in response those neurons update their activations in a transient, time-dependent manner, similar to the operation of real biological neurons.

The neural network 100 further shows the receipt of a spike, represented in the value $x_i$, at neuron i in a first set of neurons (e.g., a neuron of the first set of nodes 110). The output of the neural network 100 is also shown as a spike, represented by the value $y_j$, which arrives at neuron j in a second set of neurons (e.g., a neuron of the first set of nodes 110) via a path established by the connections 120. In a spiking neural network all communication occurs over event-driven action potentials, or spikes. In an example, spikes convey no information other than the spike time as well as a source and destination neuron pair. Computations may variously occur in each a respective neuron as a result of the dynamic, nonlinear integration of weighted spike input using real-valued state variables. The temporal sequence of spikes generated by or for a particular neuron may be referred to as its "spike train."

In an example of a spiking neural network, activation functions occur via spike trains, which means that time is a factor that has to be considered. Further, in a spiking neural network, each neuron may provide functionality similar to that of a biological neuron, as the artificial neuron receives its inputs via synaptic connections to one or more "dendrites" (part of the physical structure of a biological neuron), and the inputs affect an internal membrane potential of the artificial neuron "soma" (cell body). In a spiking neural network, the artificial neuron "fires" (e.g., produces an output spike), when its membrane potential crosses a firing threshold. Thus, the effect of inputs on a spiking neural network neuron operate to increase or decrease its internal membrane potential, making the neuron more or less likely to fire. Further, in a spiking neural network, input connections may be stimulatory or inhibitory. A neuron's membrane potential may also be affected by changes in the neuron's own internal state ("leakage").

FIG. 1 also illustrates an example inference path 140 in a spiking neural network, such as may be implemented by a form of the neural network 100 or other forms of neural networks. The inference path 140 of the neuron includes a pre-synaptic neuron 142, which is configured to produce a pre-synaptic spike train $x_i$ representing a spike input. A spike train is a temporal sequence of discrete spike events, which provides a set of times specifying at which time a neuron fires.

As shown, the spike train $x_i$ is produced by the neuron before the synapse (e.g., neuron 142), and the spike train $x_i$ is evaluated for processing according to the characteristics of a synapse 144. For example, the synapse may apply one or more weights, e.g., weight $w_{ij}$, which are used in evaluating the data from the spike train $x_i$. Input spikes from the spike train $x_i$ enter a synapse such as synapse 144 which has a weight $w_{ij}$. This weight scales what the impact of the presynaptic spike has on the post-synaptic neuron (e.g., neuron 146). If the integral contribution of all input connections to a post-synaptic neuron exceeds a threshold, then the post-synaptic neuron 146 will fire and produce a spike. As shown, $y_j$ is the post-synaptic spike train produced by the neuron following the synapse (e.g., neuron 146) in response to some number of input connections. As shown, the post-synaptic spike train $y_j$ is distributed from the neuron 146 to other post-synaptic neurons.

Figure 2:
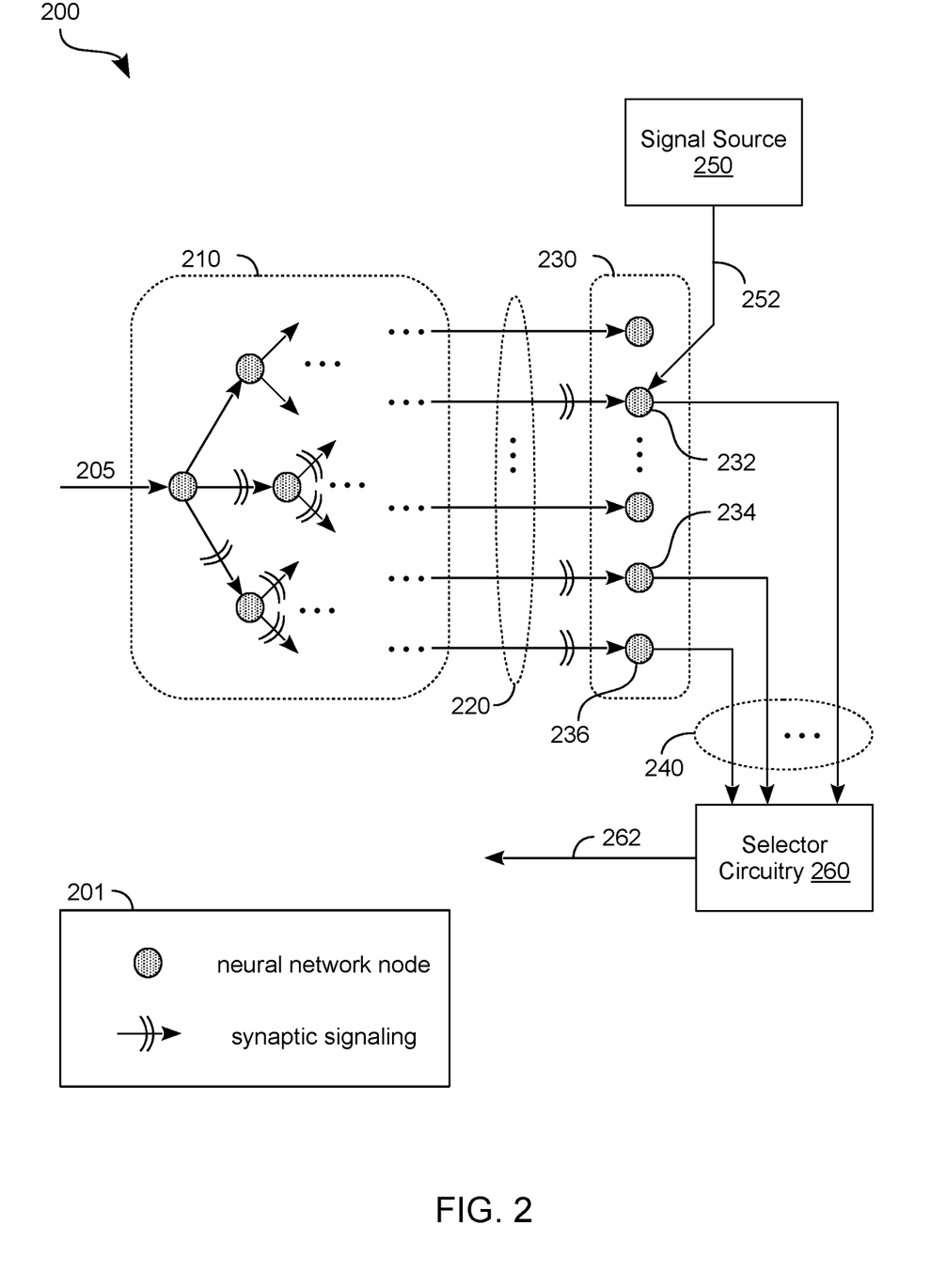
FIG. 2 is a functional block diagram illustrating features of a system to perform a context-based search with a spiking neural network according to an embodiment.

FIG. 2 shows features of a system 200 to provide context-based search functionality according to an embodiment. System 200 is one example of an embodiment wherein spiking neural network includes nodes which each correspond to a different respective entry of a repository, wherein signaling received by the spiking neural network—the signaling based on a context of a search query—results in respective harmonic responses by one or more such nodes. Additional signaling may perturb one such harmonic response to facilitate the determining of a query result. System 200 may include features of spiking neural network 100, for example.

As shown in FIG. 2, system 200 may include a spiking neural network 210 and a spiking neural network 230 coupled thereto—e.g., wherein synapses 220 of system 200 variously couple output nodes of spiking neural network 210 each to a respective node of spiking neural network 230. Some or all nodes of spiking neural network 230 may each correspond to a respective entry of a repository (or "repository entry"), wherein system 200 enables functionality to search the repository. For example, multiple nodes of spiking neural network 230 may each include the content of a respective repository entry, or may be configured to provide or otherwise indicate an address, index value or other information to facilitate access to such a repository entry.

In some embodiments, data which is stored at (or is to be stored at) a particular repository entry may include or otherwise be associated with a respective plurality of contexts—e.g., wherein some or all such contexts are available for subsequent use as parameters of a query to search for that repository entry. The association of contexts with the data may be specified a priori to system 200 by a database user, a system manager, content analysis software or other such source. Alternatively, the association may be determined by circuitry (not shown) of system 200—e.g., wherein the circuitry identifies the contexts as respective tags for that repository entry. The initial association of various contexts with content of a given repository entry, and the communication of such an association to system 200, may be adapted from any of a variety of techniques, which are not limiting on some embodiments, and are not detailed herein to avoid obscuring certain features of various embodiments.

Of the multiple nodes of spiking neural network 230 which are to correspond to respective repository entries, each such node may be trained or otherwise configured to output a respective signal (e.g., in response to signaling which that node receives from spiking neural network 210) which indicates a selection of the repository entry to which the node corresponds. For example, one such node may output a spike train, a spiking pattern of which is predefined as being representative of a selection of that node (and, correspondingly, a selection of the repository entry associated with that node). By contrast, an alternative signal response of by that same node—e.g., based on a different type of signaling received from spiking neural network 210—may instead represent a failure of that node (and its associated repository entry) to be selected. In some embodiments, a spiking pattern of a spike train output by such a node may be mapped to or otherwise associated with a location of a corresponding repository entry. Alternatively or in addition, a path by which the spike train is communicated may be mapped or otherwise associated with such a location. A mapping or other associating of repository entries to nodes of spiking neural network 230 may be defined or otherwise implemented with selector circuitry 260 of system 200, for example.

In an embodiment, spiking neural network 210 facilitates at least in part the servicing of a search query to identify a repository entry which corresponds to a node of spiking neural network 230. For example, spiking neural network 210 may receive, as input signaling, some first one or more spike trains which include an encoded representation of a first context of the search query—e.g., where the search query is to identify any repository entry to which both the first context and a second context apply. Spiking neural network 210 may be trained and/or otherwise configured to generate, in response to the first one or more spike trains, a second one or more spike trains which are to select one or more nodes of spiking neural network 230. More particularly, the second one or more spike trains may selectively induce one or more signal responses by one or more nodes of spiking neural network 230—e.g., wherein each of the one or more nodes corresponds to a respective repository entry to which the first context applies.

For example, spiking neural network 210 may be configured to support a context-based search functionality based on any of n contexts $c_1, \ldots, c_m$ (where m is an integer greater than 1). At a given time, for each context $c_x$ of the m contexts $c_1, \ldots, c_m$, there may be a corresponding subset Nx of nodes of spiking neural network 230, wherein the one or more nodes of subset Nx (and, for example, only those one or more nodes) each correspond to a respective repository entry to which that context cx applies. For each context cx (and its corresponding node subset Nx), there may also be a corresponding subset Sx of the synapses 220 which couple spiking neural network 210 to spiking neural network 230—e.g., wherein each of the one or more synapses of subset Sx couples spiking neural network 210 to a respective node of the subset Nx.

To support searching based on any given one of the m contexts c1, . . . , cm, spiking neural network 210 may selectively provide output signaling via a corresponding one of m available subsets S1, . . . , Sm of synapses 220 (where each such subset includes a different respective combination of one or more of synapses 220). In turn, subsets S1, . . . , Sm may correspond, respectively, to m available subsets N1, . . . , Nm of the nodes of spiking neural network 230 (where each such subset includes one or more nodes each corresponding to a respective repository entry). Accordingly, in response to an indication of a context cx, spiking neural network 210 may output signaling, via the one or more synapses of the corresponding subset Sx, to excite a respective signal response by each node of the corresponding node subset Nx of spiking neural network 230.

In the example embodiment shown, spiking neural network 210 receives one or more spike trains (e.g., including the illustrative spike train 205 shown) which include or otherwise communicate an encoded representation of a first context of a search query. Based on the first context being represented with spike train 205, spiking neural network 210 may selectively output one or more spike patterns via a subset of synapses 220 which corresponds to that first context. For example, spike train 205 may initiate sequential synaptic signaling (see legend 201 of FIG. 1) along various paths within spiking neural network 210, where such signaling contributes to an at least partial result for the search query. Based on such signaling within spiking neural network 210, selective ones of synapses 220 may be excited—e.g., wherein one or more spike trains are output each via a respective synapse in a subset of synapses 220.

By way of illustration and not limitation, spiking neural network 230 may comprise nodes 232, 234, 236 which each include or otherwise correspond to a respective repository entry to which the first context applies. In such an embodiment, a subset of synapses 220 which corresponds to that first context may include synapses which are coupled each to a respective one of nodes 232, 234, 236. The one or more output spike trains communicated via such synapses may variously excite nodes 232, 234, 236 each to provide a respective signal response which indicates an at least provisional selection (or other such identification) of the corresponding repository entry. Other nodes of spiking neural network 230 (to which the first context does not apply) may be omitted from excitation to generate any such signal response.

The various signal responses by nodes 232, 234, 236 (based on the indication of the first context with spike train 205) may each include a respective resonant—e.g., cyclical—component. For example, additional synapses (not shown) may be variously coupled each between a respective two nodes of spiking neural network 230. Such additional synapses of spiking neural network 230 may variously communicate inhibitory signals and/or excitatory signal whereby the membrane voltage or signal output of one node affects the membrane voltage or signal output of another node. As a result, the excitations of nodes of spiking neural network 230 (e.g., based on signaling received via synapses 220) may be coupled to one another—e.g., wherein some or all of cyclical responses by nodes 232, 234, 236 have similar frequencies, phases, phase precessions and/or the like. Cyclical responses by nodes 232, 234, 236 (for example) may be additionally or alternatively based on one or more bias currents provided to spiking neural network 230. In some embodiments, such cyclical responses may be additionally or alternatively based on wavelike spike patterns being communicated to nodes 232, 234, 236 each via a respective one of synapses 220.

In the example scenario shown for system 200, the respective cyclical responses concurrently provided by nodes 232, 234, 236 indicate a partial search query result, based on the first context which was indicated with spike train 205. Some embodiments further narrow this partial search query result by communicating to spiking neural network 230 one or more signals which are based on a second context of the search query. For example, system 200 may further include or couple to circuitry (such as the illustrative signal source 250 shown) for signaling each node of spiking neural network 230 which is associated with the second context. Such signaling may include a signal 252 to node 232 and additional signaling (not shown) of any other node which represents a repository entry to which the second context applies—e.g., wherein nodes 234, 236 do not receive any such signaling based on the second context. In one embodiment, signal source 250 includes or otherwise operates based on another spiking neural network (e.g., providing functionality similar to that of spiking neural network 210) or any of various other mechanisms to selectively signal nodes on the basis of a given context.

Signal 252 may selectively perturb the cyclical response by node 232 which is based on synaptic signaling from spiking neural network 210. Perturbance of the cyclical response by node 232 may be concurrent with the respective cyclical responses of nodes 234, 236 (which are also based on the first context being indicated with spike train 205). Due to a coupling of nodes 232, 234, 236 to one another via synapses (not shown) of spiking neural network 230, the perturbance which is selectively provided by signal 252 may result in a change to some or all of the respective cyclical responses by such nodes.

By way of illustration and not limitation, a phase relationship—e.g., including a phase-precession relationship—may change between node 232 and one or both of nodes 234, 236. In some embodiments, nodes 232, 234, 236 may exhibit one or more characteristics which are analogous to those of mechanically coupled resonators—e.g., wherein signaling energy which might otherwise be exhibited by one such node/resonator is instead transferred to another node/resonator. As a result, a change to the cyclical response by node 232 may include, for example, an absolute increase to the amplitude thereof, or at least a relative increase as compared to a resulting (decreased) amplitude of a cyclical response by one of nodes 234, 236.

In some embodiments, system 200 includes or couple to hardware and/or executing software logic (e.g., provided with the illustrative selector circuitry 260 shown) which is to determine a result of the search query which is based on the first context and the second context. For example, selector circuitry 260 may comprise a processor, application specific integrated circuit (ASIC), field programmable gate array (FPGA) or other integrated circuitry which is to receive an output from the set of nodes 230. Such an output (e.g., including some or all of the illustrative one or more signals 240 shown) may indicate respective cyclical responses by the one or more nodes (e.g., including nodes 232, 234, 236) which have been variously excited by signaling from the set of nodes 210 and the subsequent signal 252. For example, selector circuitry 260 may detect that, subsequent to perturbance by signal 252, one or more characteristics of a cyclical response by node 232 are relatively more pronounced—e.g., as compared to corresponding characteristics of respective cyclical responses by nodes 234, 236.

In one embodiment, selector circuitry 260 identifies node 232 as providing a response amplitude which is greater than some threshold level and/or greater than response amplitudes provided by either of nodes 234, 236. Based on such detection, selector circuitry 260 may output a signal 262 which specifies or otherwise indicates the repository entry corresponding to node 232 as being a result of the search query. Signal 260 may, for example, specify an address or other index value for locating the repository entry—e.g., wherein other circuitry (not shown) subsequently retrieves content of the repository entry based on signal 260. Alternatively, signal 260 may include some or all of content of the repository entry to which node 232 corresponds.

Figure 3:
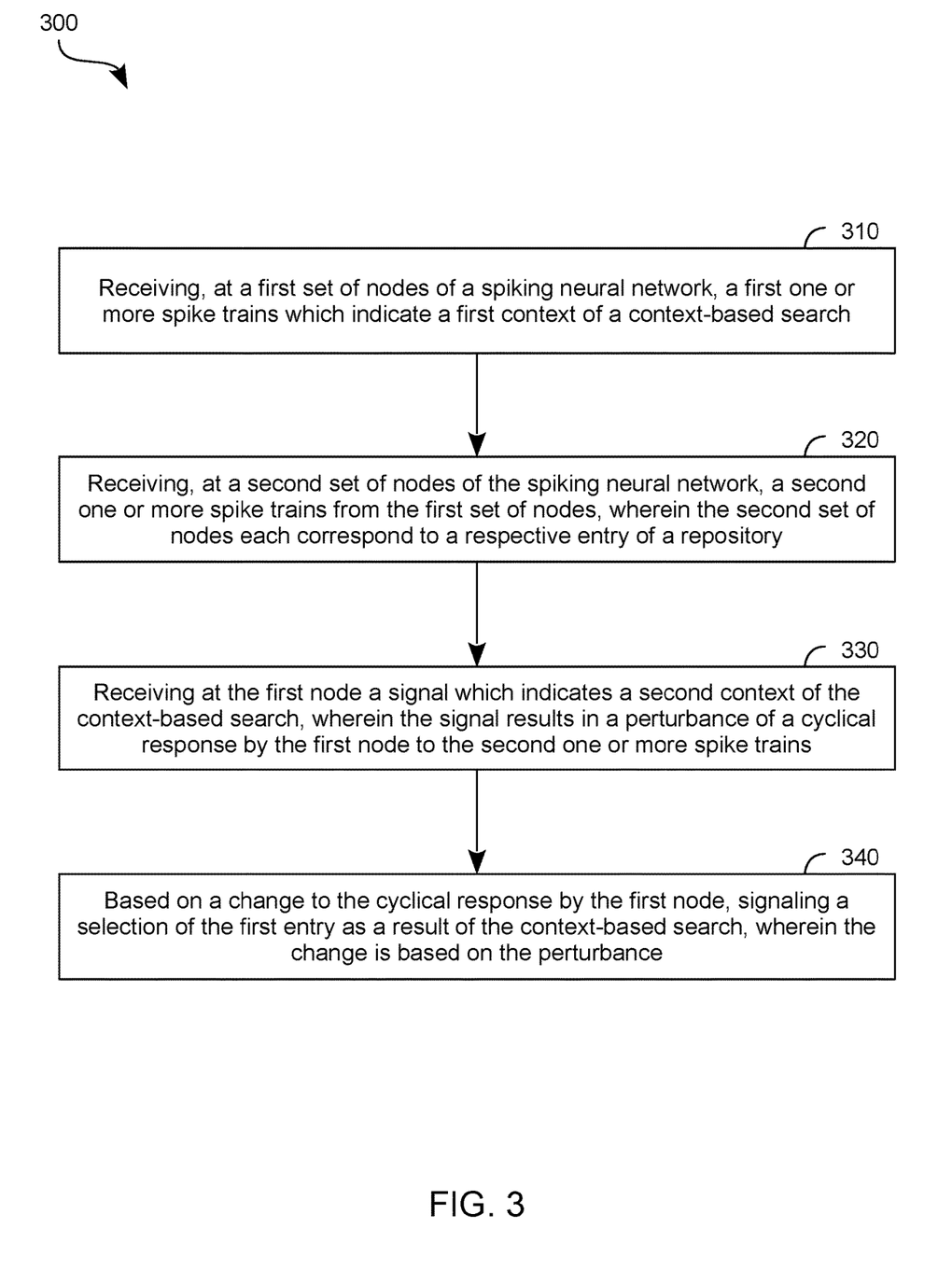
FIG. 3 is a flow diagram illustrating features of a method to search a repository with spiking neural networks according to an embodiment.

FIG. 3 shows features of a method 300 to perform a context-based search using a spiking neural network according to an embodiment. Method 300 may be performed with neural network 100 or system 200, for example. As shown in FIG. 3, method 300 may include (at 310) receiving, at a first set of nodes of a spiking neural network, a first one or more spike trains which indicate a first context of a repository search. For example, the receiving at 310 may include spike train 205 being received at one or more input nodes of the set of nodes 210. The first one or more spike trains may result in subsequent spike trains being variously communicated among nodes within the first set of nodes—e.g., wherein such signaling is to contribute to an at least partial result of the repository search.

Method 300 may further comprise (at 320) receiving, a second set of nodes of the spiking neural network, a second one or more spike trains from the first set of nodes. The second one or more spike trains may be based on the first one or more spike trains. For example, the receiving at 320 may include the set of nodes 230 receiving one or more spike trains via a subset of synapses 220 which, due at least in part to a training or other configuration of the first set of nodes, corresponds to the first context. Some or all such nodes of the second spiking network may each correspond to a respective entry of a repository—e.g., wherein a first node (such as node 232) of the second set of nodes corresponds to a first entry of the repository. In other embodiments, method 300 is based on, but may omit, the receiving at 310—e.g., wherein method 300 is performed with circuit logic (other than any of the first set of nodes) which only includes the second set of nodes and, in some embodiments, circuitry to perturb a resonant response by the second set of nodes and/or to receive one or more output signals from the second set of nodes.

In an embodiment, method 300 further comprises (at 330) receiving at the first node a signal which indicates a second context of the repository search. For example, the receiving at 330 may include signal 252 being received at node 232. The signal may be received at 330 while one or more nodes of the second set of nodes each exhibits a respective cyclical response based on the second one or more spike trains. Such one or more nodes may include the first node, wherein the signal received at 330 results in a perturbance of the cyclical response by that first node (e.g., but not one or more other nodes of the one or more nodes). For each node of the one or more nodes, the node may be coupled to one or more other nodes of the one or more nodes each by a respective inhibitor synapse or by a respective excitatory synapse. Such coupling of nodes may contribute to cyclical responses by the one or more nodes having similar frequencies, phases and/or phase precessions.

With respect to the perturbance of a given cyclical response (such at that resulting from the signal received at 330), a duration of such a perturbance may be less than a period—that is, for one cycle—of the cyclical response. The duration may be less than half—e.g., less than twenty percent and, in some embodiments, less than ten percent—of the period of a largest amplitude component of the response. Additionally or alternatively, a magnitude of the perturbance may be at least ten percent—e.g., at least twenty percent and, in some embodiments, at least thirty percent—of a value which the cyclical response would otherwise have at that time in the absence of said perturbance. For example, a magnitude of the perturbance may be greater than a largest amplitude of the cyclical response (the largest amplitude in the absence of said perturbance). In some embodiments, the perturbance resulting from the signal received at 330 includes an addition of one or more signal spikes to the cyclical response, a temporary dampening of the cyclical response by the first node, a temporary inversion of the cyclical response by the first node, or a temporary magnification of the cyclical response.

Method 300 may further comprise, at 340, signaling a selection of the first entry as a result of the repository search, wherein such signaling is based on a change to the cyclical response by the first node (wherein the change, in turn, is based on the perturbance). For example, the one or more nodes of the second set of nodes may further include one or more nodes other than the first node, wherein the change to the cyclical response by the first node includes a change relative to the other respective cyclical response(s) by the one or more other nodes. In such an embodiment, the other respective cyclical response(s) may each decrease in magnitude in response to the perturbance. Alternatively or in addition, the change to the cyclical response by the first node may include an absolute increase to a magnitude of the cyclical response by the first node.

Although some embodiments are not limited in this regard, method 300 may additionally or alternatively comprise one or more other operations (not shown) which are based on the various receiving and signaling of operations 310, 320, 330, 340. Such one or more other operations may include identifying, based on signaling of a selection at 340, an address or other index value which indicates a location of the first entry. In such an embodiment, method 300 may further comprise performing a lookup of the first entry based on the identified index value. Additionally or alternatively, other operations (not shown) of method 300 may include identifying one or more nodes (e.g., a subset) of the second set of nodes which each exhibit a respective cyclical response based on the second one or more spike trains. Such identifying may include detecting such cyclical responses, by selector circuitry 260 or other such logic, at a time which is during such cyclical responses but before the perturbance of the cyclical response by the first node. Based on an identifying of the one or more nodes, method 300 may selectively limit the set of any nodes of the second set of nodes which are to receive a signal (such as the signal received at 330) which indicates the second context of the search query. Alternatively or in addition, based on an identifying of the one or more nodes, method 300 may selectively limit the set of any nodes of the second set of nodes for which output signaling is to be evaluated to determine the result of the search query.

Figure 4:
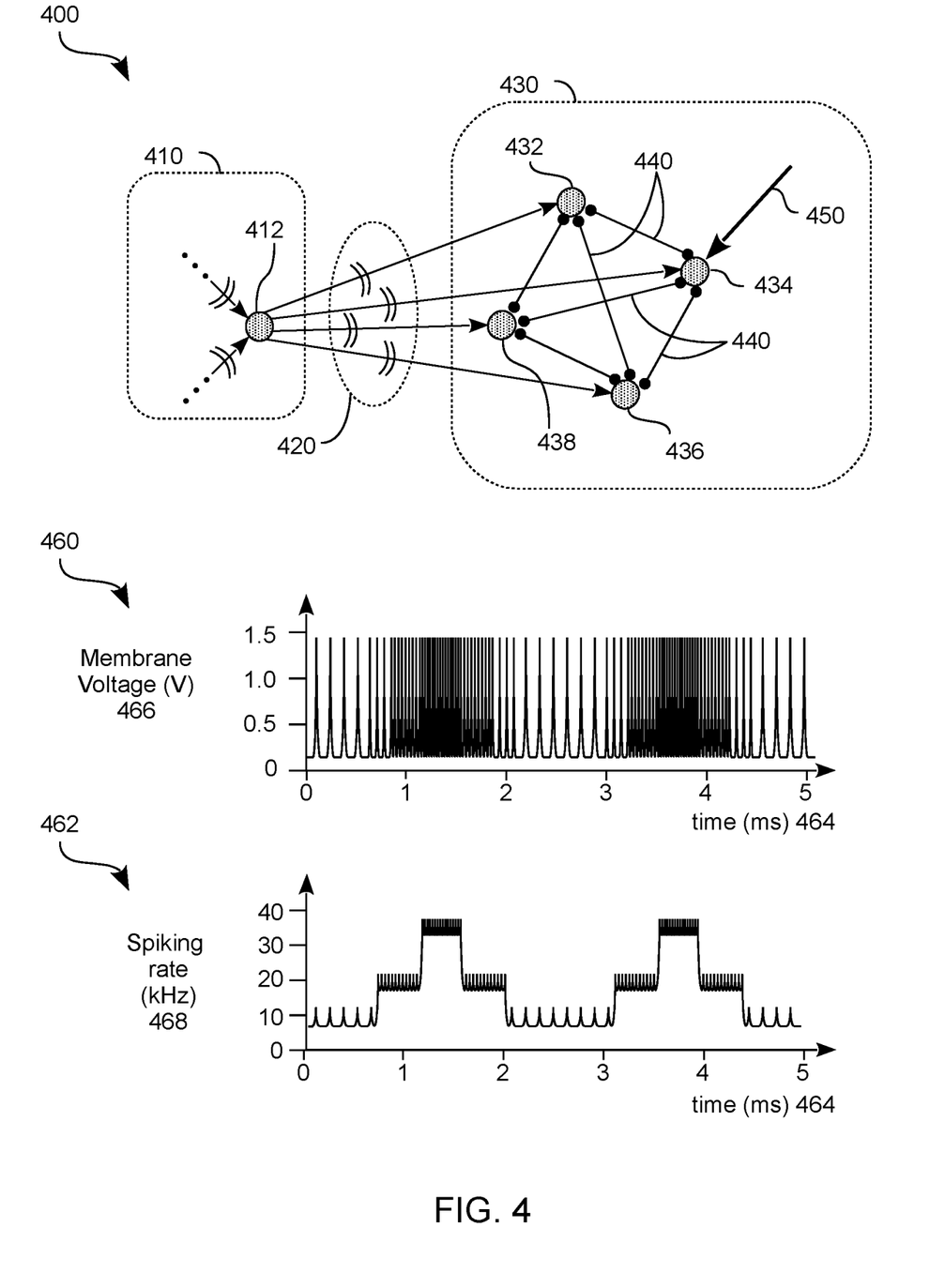
FIG. 4 shows a functional block diagram and timing diagrams variously illustrating features of a system to perform a context-based search according to an embodiment.

FIG. 4 shows features of a system 400 to provide search functionality with a spiking neural network according to an embodiment. System 400 is one example of an embodiment wherein nodes of a spiking neural network (the nodes corresponding to respective repository entries) are variously coupled to one another, via respective synapses, to facilitate cyclical response characteristics which facilitate a search functionality. For example, system 400 may include some or all of the features of system 200, and/or may support search techniques according to method 300.

As shown in FIG. 4, system 400 may include a spiking neural network comprising sets of nodes 410, 430 and synapses 420 coupled therebetween—e.g., wherein set of nodes 410, 430 and synapses 420 correspond functionally to set of nodes 210, 230 and synapses 220, respectively. During operation of system 400, one or more output nodes of the set of nodes 410 (e.g., including the illustrative node 412 shown) may output one or more spike trains to excite respective cyclical responses by each node of one or more nodes—e.g., a subset—of the set of nodes 230. Excitation of the one or more nodes may be based on another one or more spike trains (not shown) provided to the set of nodes 410 to indicate a first context of a search query. In the example embodiment shown, such one or more nodes includes the illustrative nodes 432, 434, 436, 438, where other nodes (not shown) of the set of nodes 430 are excluded from any excitation to exhibit a cyclical response based on the first context.

FIG. 4 also shows timing diagrams 460, 462 which variously illustrate, each with respect to a time axis 464, a cyclical response that, for example, may be provided by node 434 (or alternatively, by some other node nodes 432, 434, 436, 348). More particularly, timing diagram 460 shows a membrane voltage 466 of node 434 and timing diagram 462 shows a spiking rate 468 of membrane voltage 466. The spiking rate 468 may represent a count of signal spikes of membrane voltage 466 which take place within a fixed size time-window as that time-window moves across the domain of time axis 464.

As shown by spiking rate 468, membrane voltage 466 (and, in some embodiments, a signal output by node 434 based on membrane voltage 466) may exhibit a resonant component including a generally cyclical pattern of an increasing spike rate followed by a subsequent decreasing spike rate. Such cyclical spike rate changes may include continuous changes and/or step-wise changes, in various embodiments.

The respective membrane voltages of nodes 432, 436, 438 may similarly exhibit cyclical characteristics that, for example, are due in part to one or more sinusoidal bias currents being provided to some or all nodes of the set of nodes 430. For example, nodes of the set of nodes 430 may be variously configured each to exhibit, in response to excitation from the set of nodes 410, a respective base-level cyclical response such as an oscillatory signal spiking rate. This may be facilitated in part by providing node 434 (for example) with a sinusoidal bias current $J_b$—e.g., according to the following:

$$J_b = A_0 \sin(\omega t + \phi) \quad (3)$$

where t is time and where $A_0$, $\omega$, and $\phi$ are an amplitude, frequency and phase (respectively) of bias current $J_b$. The value of frequency $\omega$ may facilitate signal processing by which node 434 integrates a stimulus, received via one of synapses 420, over multiple time periods which, for example, are each equal to the membrane time-constant ($\tau_m$) for node 434.

Referring again to system 400, synapses (e.g., including the illustrative inhibitor synapses 440 shown) may be variously coupled each between a respective two nodes of a subset of nodes, where the subset comprises nodes 432, 434, 436, 438. Synaptic connections such as those provided by synapses 440 may contribute to the respective cyclical responses of nodes 432, 434, 436, 438 having similar frequencies, phases and/or phase precessions. Additionally or alternatively, such synaptic connections may facilitate a selection of one of nodes 432, 434, 436, 438 over some or all of the others of nodes 432, 434, 436, 438—e.g., where such selection is based on a perturbance of one such cyclical response.

Figure 5:
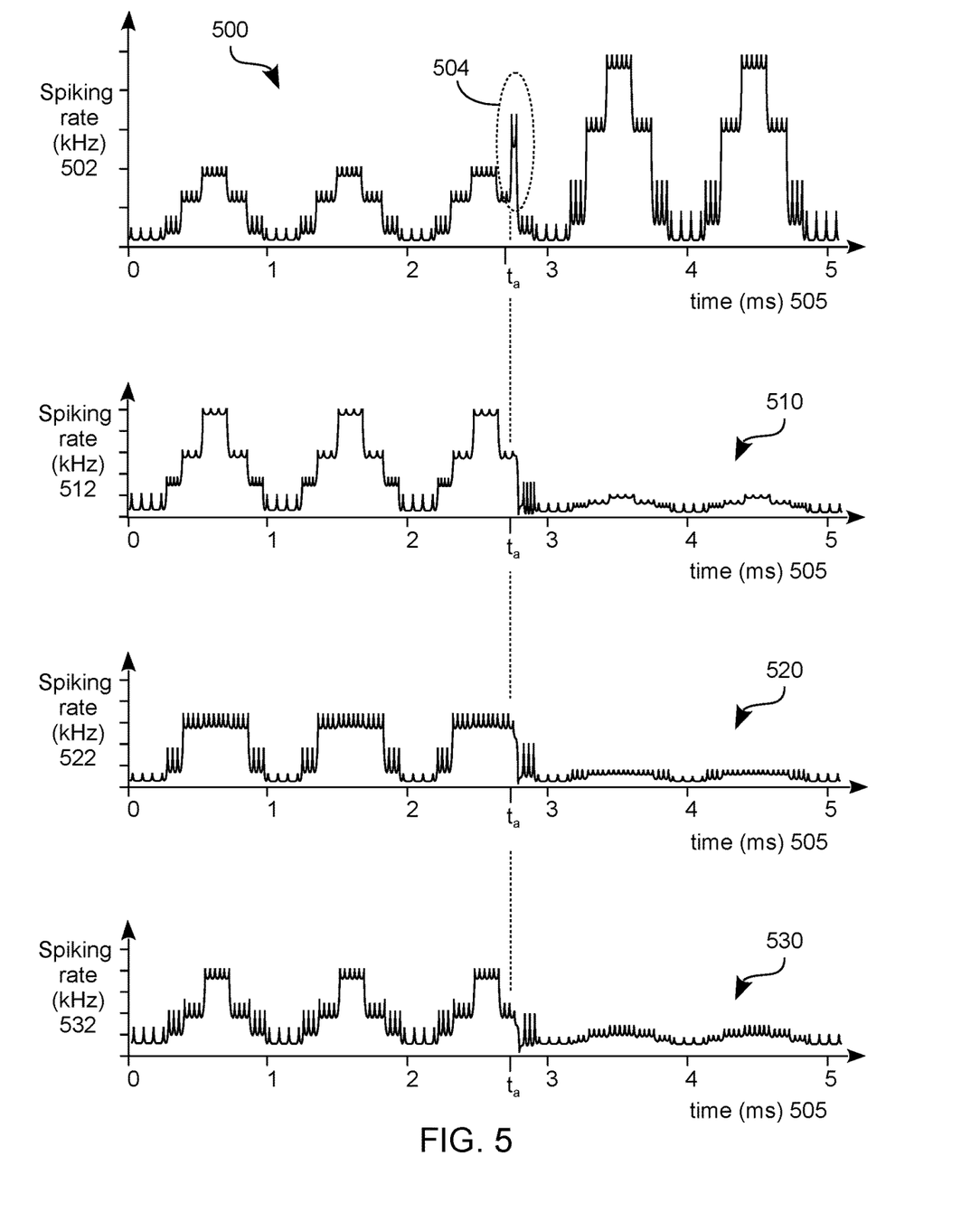
FIG. 5 shows timing diagrams variously illustrating signals generated as part of a context-based search performed with a spiking neural network according to an embodiment.

For example, a signal 450 (such as signal 252) may be provided to node 434 based on a second context of the search query, wherein node 434 corresponds to a repository entry to which both the first context and the second context apply. In such an embodiment, signal 450 may perturb a resonant component of membrane voltage 466 (and/or another cyclical response by node 434). FIG. 5 shows timing diagrams 500, 510, 520, 530 which variously illustrate, each with respect to a time axis 505, rates of spiking by the respective membrane voltages of nodes 434, 432, 436, 438. More particularly, timing diagrams 500, 510, 520, 530 show spiking rates 502, 512, 522, 532 which are exhibited (respectively) by nodes 434, 432, 436, 438. During at least the first two milliseconds shown for time axis 505, spiking rates 502, 512, 522, 532 each exhibit a respective resonant characteristic including a generally cyclical pattern of an increasing spike rate followed by a subsequent decreasing spike rate. The various magnitudes and periods of these generally cyclical patterns are merely illustrative, and some or all of which may vary in different embodiments according to implementation-specific details. The cyclical responses illustrated by spiking rates 502, 512, 522, 532 may each be based on signal spike excitations—e.g., received from the set of nodes 410—which are based on a first context of a search query. During these cyclical responses, one such cyclical response—e.g., that of node 434—may be perturbed by another signal which is based on a second context of the search query.

By way of illustration and not limitation, such a signal may result in a perturbation 504 of spiking rate 502 (and of the corresponding membrane voltage of node 434 which exhibits spiking rate 502) at a time $t_a$. Due at least in part to a synaptic coupling between nodes 432, 434, 436, 438 (the synaptic coupling including synapses 440, for example), perturbation 504 may result in a change to a cyclical response by node 434—e.g., at least relative to some or all of the respective cyclical responses by nodes 432, 436, 438. For example, one or more of nodes 432, 436, 438 may each exhibit a relatively attenuated cyclical response after time $t_a$, as compared to before perturbation 504. Alternatively or in addition, node 434 may exhibit a relatively amplified cyclical response after time $t_a$, as compared to before perturbation 504. This increased cyclical response by node 434, at least relative to the cyclical responses of nodes 432, 436, 438, may facilitate a subsequent identification of node 434 as corresponding to a repository entry to which both the first context and the second context apply.

Figure 6:
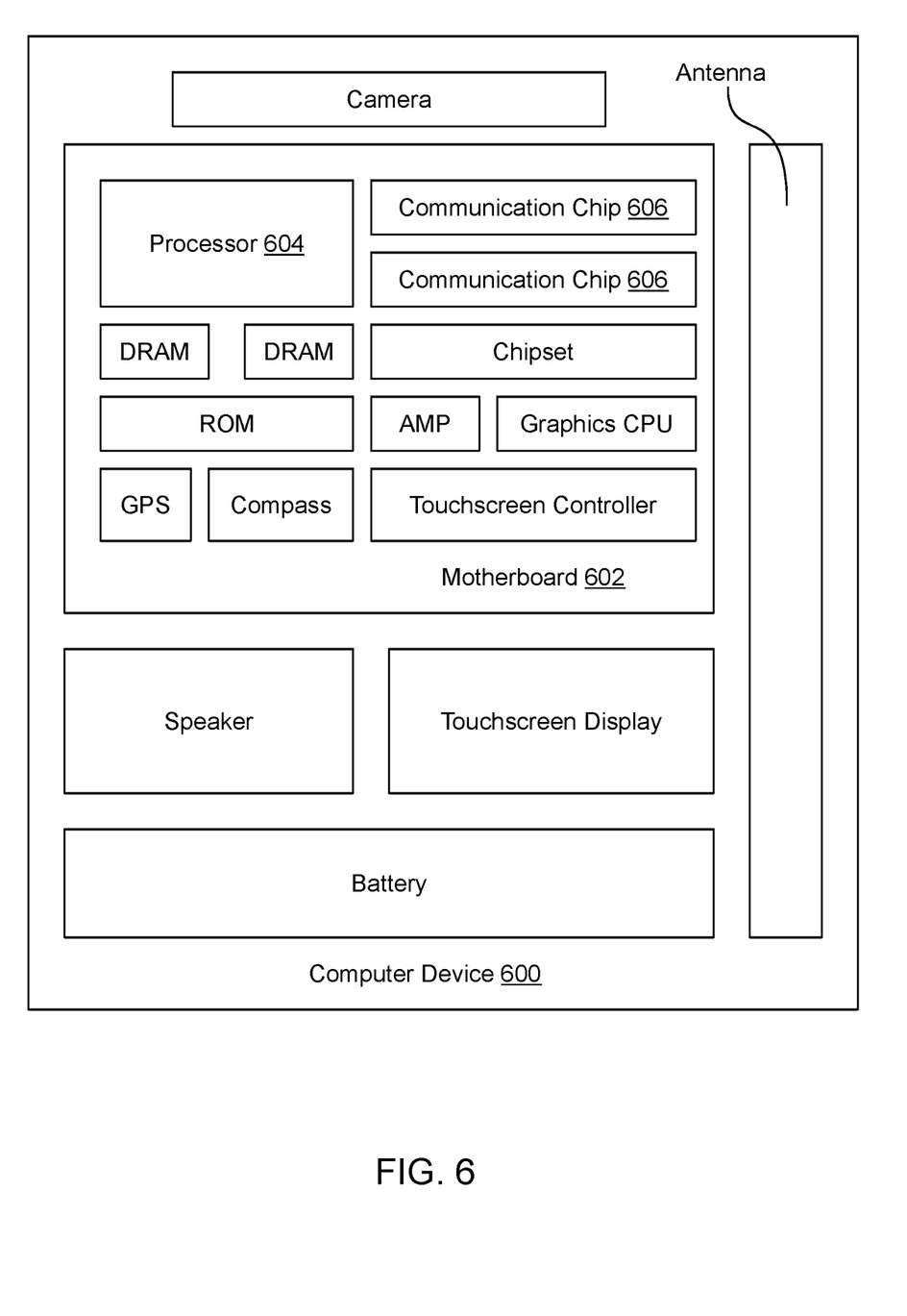
FIG. 6 is a functional block diagram illustrating a computing device in accordance with one embodiment.

FIG. 6 illustrates a computing device 600 in accordance with one embodiment. The computing device 600 houses a board 602. The board 602 may include a number of components, including but not limited to a processor 604 and at least one communication chip 606. The processor 604 is physically and electrically coupled to the board 602. In some implementations the at least one communication chip 606 is also physically and electrically coupled to the board 602. In further implementations, the communication chip 606 is part of the processor 604.

Depending on its applications, computing device 600 may include other components that may or may not be physically and electrically coupled to the board 602. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 606 enables wireless communications for the transfer of data to and from the computing device 600. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 606 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 600 may include a plurality of communication chips 606. For instance, a first communication chip 606 may be dedicated to shorter range wireless communications such as Wi-Fi and Bluetooth and a second communication chip 606 may be dedicated to longer range wireless communications such as GPS, EDGE, GPRS, CDMA, WiMAX, LTE, Ev-DO, and others.

The processor 604 of the computing device 600 includes an integrated circuit die packaged within the processor 604. The term "processor" may refer to any device or portion of a device that processes electronic data from registers and/or memory to transform that electronic data into other electronic data that may be stored in registers and/or memory. The communication chip 606 also includes an integrated circuit die packaged within the communication chip 606.

In various implementations, the computing device 600 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 600 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 7:
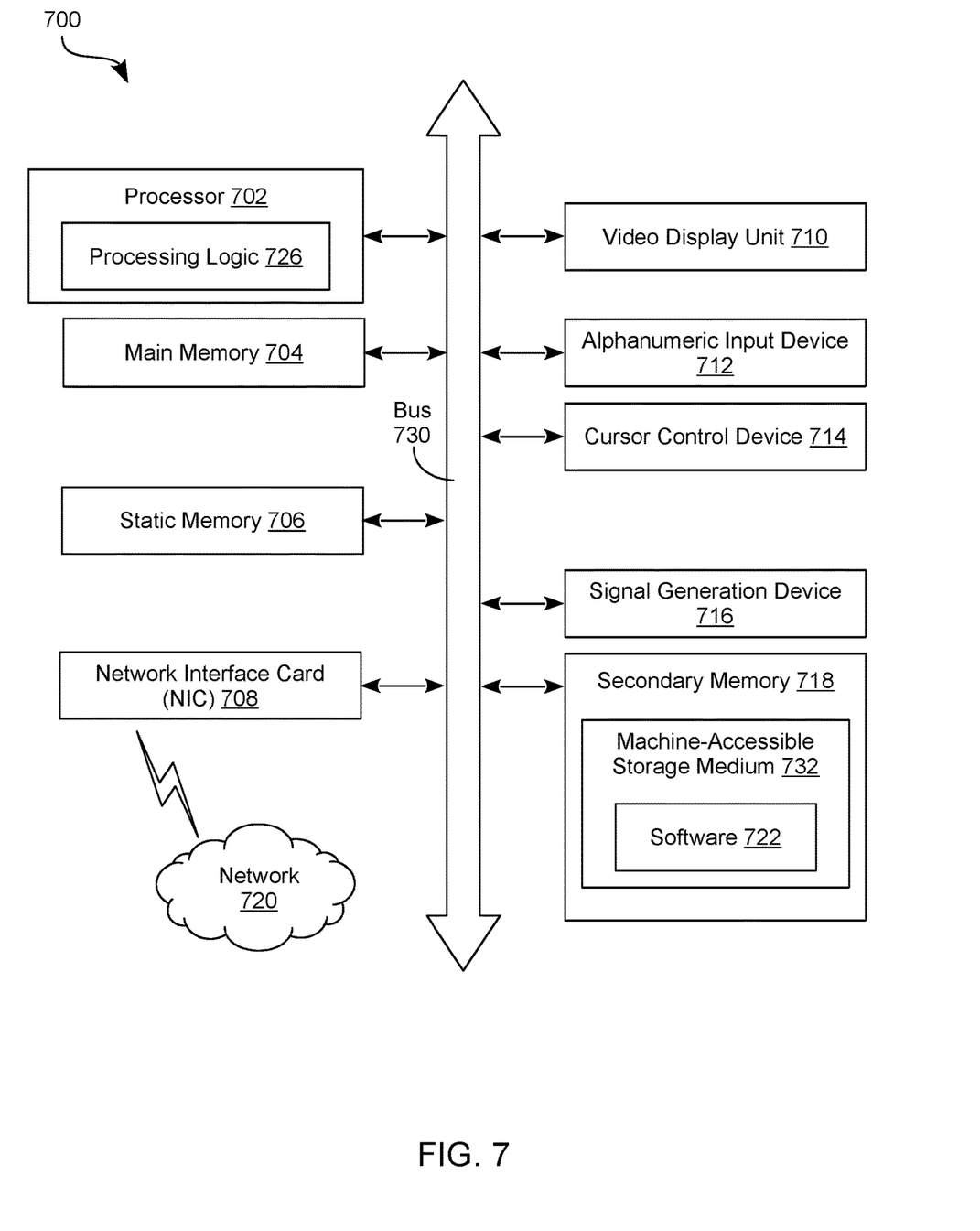
FIG. 7 is a functional block diagram illustrating an exemplary computer system, in accordance with one embodiment.

FIG. 7 illustrates a diagrammatic representation of a machine in the exemplary form of a computer system 700 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory 718 (e.g., a data storage device), which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations described herein.

The computer system 700 may further include a network interface device 708. The computer system 700 also may include a video display unit 710 (e.g., a liquid crystal display (LCD), a light emitting diode display (LED), or a cathode ray tube (CRT)), an alphanumeric input device 712 (e.g., a keyboard), a cursor control device 714 (e.g., a mouse), and a signal generation device 716 (e.g., a speaker).

The secondary memory 718 may include a machine-accessible storage medium (or more specifically a computer-readable storage medium) 732 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface device 708.

While the machine-accessible storage medium 732 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Example 1 is a computer device for context-based search with a spiking neural network, the computer device comprising circuitry to receive, at a first set of nodes of the spiking neural network, a first one or more spike trains which indicate a first context of a context-based search, and receive, at a second set of nodes of the spiking neural network, a second one or more spike trains from the first set of nodes, wherein each node of the second set of nodes corresponds to a respective entry of a repository, wherein a first node of the second set of nodes corresponds to a first entry of the repository. The circuitry is further to receive at the first node of the second set of nodes a signal which indicates a second context of the context-based search, wherein one or more nodes of the second set of nodes exhibits a respective cyclical response based on the second one or more spike trains, wherein the subset includes the first node, wherein the signal results in a perturbance of the cyclical response by the first node, and signal, based on a change to the cyclical response by the first node, a selection of the first entry as a result of the context-based search, wherein the change is based on the perturbance.

In Example 2, the subject matter of Example 1 optionally includes the computer device comprising circuitry to send the signal to each of the one or more nodes of the second set of nodes.

In Example 3, the subject matter of Example 2 optionally includes the computer device further comprising circuitry to detect the respective cyclical responses by the one or more nodes of the second set of nodes, and identify the one or more nodes of the second set of nodes based on a detection of the cyclical responses, wherein circuitry to send the signal to each node of the one or more nodes of the second set of nodes includes circuitry to selectively send the signal to the identified one or more nodes of the second set of nodes.

In Example 4, the subject matter of any one or more of Examples 1 through 2 optionally includes wherein, for each node of the subset, the node is coupled to one or more other nodes of the subset each by a respective inhibitor node.

In Example 5, the subject matter of any one or more of Examples 1, 2 and 4 optionally includes wherein the perturbance of the cyclical response by the first node includes at least one of an addition of one or more signal spikes to the cyclical response by the first node, a temporary dampening of the cyclical response by the first node, a temporary inversion of the cyclical response by the first node, or a temporary magnification of the cyclical response by the first node.

In Example 6, the subject matter of any one or more of Examples 1, 2, 4 and 5 optionally includes wherein the one or more nodes of the second set of nodes further includes one or more other nodes, and wherein the change to the cyclical response by the first node includes a change relative to the respective one or more cyclical responses by the one or more other nodes.

In Example 7, the subject matter of Example 6 optionally includes wherein the respective one or more cyclical responses by the one or more other nodes each decrease in magnitude in response to the perturbance.

In Example 8, the subject matter of any one or more of Examples 1, 2, 4 and 5 optionally includes wherein the change to the cyclical response by the first node includes an increase to a magnitude of the cyclical response by the first node.

In Example 9, the subject matter of any one or more of Examples 1, 2, 4 and 5 optionally includes the computer device further comprising circuitry to identify an index value based on the change to the cyclical response by the first node.

In Example 10, the subject matter of Example 9 optionally includes the computer device further comprising circuitry to perform a repository entry lookup based on the index value.

Example 11 is at least one machine readable medium including instructions that, when executed by a machine, cause the machine to perform operations for context-based search with a spiking neural network, the operations comprising receiving, at a first set of nodes of the spiking neural network, a first one or more spike trains which indicate a first context of a context-based search, and receiving, at a second set of nodes of the spiking neural network, a second one or more spike trains from the first set of nodes, wherein each node of the second set of nodes corresponds to a respective entry of a repository, wherein a first node of the second set of nodes corresponds to a first entry of the repository. The operations further comprise receiving at the first node of the second set of nodes a signal which indicates a second context of the context-based search, wherein one or more nodes of the second set of nodes exhibits a respective cyclical response based on the second one or more spike trains, wherein the subset includes the first node, wherein the signal results in a perturbance of the cyclical response by the first node, and signaling, based on a change to the cyclical response by the first node, a selection of the first entry as a result of the context-based search, wherein the change is based on the perturbance.

In Example 12, the subject matter of Example 11 optionally includes the operations further comprising sending the signal to each of the one or more nodes of the second set of nodes.

In Example 13, the subject matter of Example 12 optionally includes the operations further comprising detecting the respective cyclical responses by the one or more nodes of the second set of nodes, and identifying the one or more nodes of the second set of nodes based on a detection of the cyclical responses, wherein sending the signal to each node of the one or more nodes of the second set of nodes includes selectively sending the signal to the identified one or more nodes of the second set of nodes.

In Example 14, the subject matter of any one or more of Examples 11 and 12 optionally includes wherein, for each node of the subset, the node is coupled to one or more other nodes of the subset each by a respective inhibitor node.

In Example 15, the subject matter of any one or more of Examples 11, 12 and 14 optionally includes wherein the perturbance of the cyclical response by the first node includes at least one of an addition of one or more signal spikes to the cyclical response by the first node, a temporary dampening of the cyclical response by the first node, a temporary inversion of the cyclical response by the first node, or a temporary magnification of the cyclical response by the first node.

In Example 16, the subject matter of any one or more of Examples 11, 12, 14 and 15 optionally includes wherein the one or more nodes of the second set of nodes further includes one or more other nodes, and wherein the change to the cyclical response by the first node includes a change relative to the respective one or more cyclical responses by the one or more other nodes.

In Example 17, the subject matter of Example 16 optionally includes wherein the respective one or more cyclical responses by the one or more other nodes each decrease in magnitude in response to the perturbance.

In Example 18, the subject matter of any one or more of Examples 11, 12, 14 and 15 optionally includes wherein the change to the cyclical response by the first node includes an increase to a magnitude of the cyclical response by the first node.

In Example 19, the subject matter of any one or more of Examples 11, 12, 14 and 15 optionally includes the operations further comprising identifying an index value based on the change to the cyclical response by the first node.

In Example 20, the subject matter of Example 19 optionally includes the operations further comprising performing a repository entry lookup based on the index value.

Example 21 is a method for context-based search with a spiking neural network, the method comprising receiving, at a first set of nodes of the spiking neural network, a first one or more spike trains which indicate a first context of a context-based search, and receiving, at a second set of nodes of the spiking neural network, a second one or more spike trains from the first set of nodes, wherein each node of the second set of nodes corresponds to a respective entry of a repository, wherein a first node of the second set of nodes corresponds to a first entry of the repository. The method further comprises receiving at the first node of the second set of nodes a signal which indicates a second context of the context-based search, wherein one or more nodes of the second set of nodes exhibits a respective cyclical response based on the second one or more spike trains, wherein the subset includes the first node, wherein the signal results in a perturbance of the cyclical response by the first node, and signaling, based on a change to the cyclical response by the first node, a selection of the first entry as a result of the context-based search, wherein the change is based on the perturbance.

In Example 22, the subject matter of Example 21 optionally includes the method further comprising sending the signal to each of the one or more nodes of the second set of nodes.

In Example 23, the subject matter of Example 22 optionally includes the method further comprising detecting the respective cyclical responses by the one or more nodes of the second set of nodes, and identifying the one or more nodes of the second set of nodes based on a detection of the cyclical responses, wherein sending the signal to each node of the one or more nodes of the second set of nodes includes selectively sending the signal to the identified one or more nodes of the second set of nodes.

In Example 24, the subject matter of any one or more of Examples 21 and 22 optionally includes wherein, for each node of the subset, the node is coupled to one or more other nodes of the subset each by a respective inhibitor node.

In Example 25, the subject matter of any one or more of Examples 21, 22 and 24 optionally includes wherein the perturbance of the cyclical response by the first node includes at least one of an addition of one or more signal spikes to the cyclical response by the first node, a temporary dampening of the cyclical response by the first node, a temporary inversion of the cyclical response by the first node, or a temporary magnification of the cyclical response by the first node.

Techniques and architectures for performing a context-based search with a spiking neural network are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A computer device for context-based search with a spiking neural network, the computer device comprising circuitry to:
   receive, at a first set of nodes of the spiking neural network, a first one or more spike trains which indicate a first context of a context-based search;
   receive, at a second set of nodes of the spiking neural network, a second one or more spike trains from the first set of nodes, wherein each node of the second set of nodes corresponds to a respective entry of a repository, wherein a first node of the second set of nodes corresponds to a first entry of the repository, wherein one or more nodes of the second set of nodes each exhibits a respective cyclical response based on the second one or more spike trains, wherein the one or more nodes of the second set is a subset of all nodes of the second set, and wherein the subset includes the first node;
   detect the respective cyclical responses by the one or more nodes of the second set of nodes;
   identify the one or more nodes of the second set of nodes based on a detection of the cyclical responses;
   selectively send a signal to each of the identified one or more nodes of the second set of nodes, wherein the signal indicates a second context of the context-based search;
   receive the signal at the first node of the second set of nodes wherein the signal results in a perturbance of the cyclical response by the first node; and
   signal, based on a change to the cyclical response by the first node, a selection of the first entry as a result of the context-based search, wherein the change is based on the perturbance.

2. The computer device of claim 1, wherein, for each node of the subset, the node is coupled to one or more other nodes of the subset each by a respective inhibitor node.

3. The computer device of claim 1, wherein the perturbance of the cyclical response by the first node includes at least one of:
   an addition of one or more signal spikes to the cyclical response by the first node;
   a temporary dampening of the cyclical response by the first node;
   a temporary inversion of the cyclical response by the first node; or
   a temporary magnification of the cyclical response by the first node.

4. The computer device of claim 1, wherein the one or more nodes of the second set of nodes further includes one or more other nodes, and wherein the change to the cyclical response by the first node includes a change relative to the respective one or more cyclical responses by the one or more other nodes.

5. The computer device of claim 4, wherein the respective one or more cyclical responses by the one or more other nodes each decrease in magnitude in response to the perturbance.

6. The computer device of claim 1, wherein the change to the cyclical response by the first node includes an increase to a magnitude of the cyclical response by the first node.

7. The computer device of claim 1, further comprising circuitry to identify an index value based on the change to the cyclical response by the first node.

8. The computer device of claim 7, further comprising circuitry to perform a repository entry lookup based on the index value.

9. At least one non-transitory machine readable medium including instructions that, when executed by a machine, cause the machine to perform operations for context-based search with a spiking neural network, the operations comprising:
   receiving, at a first set of nodes of the spiking neural network, a first one or more spike trains which indicate a first context of a context-based search;
   receiving, at a second set of nodes of the spiking neural network, a second one or more spike trains from the first set of nodes, wherein each node of the second set of nodes corresponds to a respective entry of a repository, wherein a first node of the second set of nodes corresponds to a first entry of the repository, wherein one or more nodes of the second set of nodes each exhibits a respective cyclical response based on the second one or more spike trains, wherein the one or more nodes of the second set is a subset of all nodes of the second set, and wherein the subset includes the first node;
   detecting the respective cyclical responses by the one or more nodes of the second set of nodes;
   identifying the one or more nodes of the second set of nodes based on a detection of the cyclical responses;
   selectively sending a signal to each of the identified one or more nodes of the second set of nodes, wherein the signal indicates a second context of the context-based search;
   receiving the signal at the first node of the second set of nodes wherein the signal results in a perturbance of the cyclical response by the first node; and
   signaling, based on a change to the cyclical response by the first node, a selection of the first entry as a result of the context-based search, wherein the change is based on the perturbance.

10. The at least one non-transitory machine readable medium of claim 9, wherein, for each node of the subset, the node is coupled to one or more other nodes of the subset each by a respective inhibitor node.

11. The at least one non-transitory machine readable medium of claim 9, wherein the perturbance of the cyclical response by the first node includes at least one of:
   an addition of one or more signal spikes to the cyclical response by the first node;
   a temporary dampening of the cyclical response by the first node;
   a temporary inversion of the cyclical response by the first node; or
   a temporary magnification of the cyclical response by the first node.

12. The at least one non-transitory machine readable medium of claim 9, wherein the one or more nodes of the second set of nodes further includes one or more other nodes, and wherein the change to the cyclical response by the first node includes a change relative to the respective one or more cyclical responses by the one or more other nodes.

13. The at least one non-transitory machine readable medium of claim 12, wherein the respective one or more cyclical responses by the one or more other nodes each decrease in magnitude in response to the perturbance.

14. The at least one non-transitory machine readable medium of claim 9, wherein the change to the cyclical response by the first node includes an increase to a magnitude of the cyclical response by the first node.

15. The at least one non-transitory machine readable medium of claim 9, the operations further comprising identifying an index value based on the change to the cyclical response by the first node.

16. The at least one non-transitory machine readable medium of claim 15, the operations further comprising performing a repository entry lookup based on the index value.

17. A method for context-based search with a spiking neural network, the method comprising:
   receiving, at a first set of nodes of the spiking neural network, a first one or more spike trains which indicate a first context of a context-based search;
   receiving, at a second set of nodes of the spiking neural network, a second one or more spike trains from the first set of nodes, wherein each node of the second set of nodes corresponds to a respective entry of a repository, wherein a first node of the second set of nodes corresponds to a first entry of the repository, wherein one or more nodes of the second set of nodes each exhibits a respective cyclical response based on the second one or more spike trains, wherein the one or more nodes of the second set is a subset of all nodes of the second set, and wherein the subset includes the first node;
   detecting the respective cyclical responses by the one or more nodes of the second set of nodes;
   identifying the one or more nodes of the second set of nodes based on a detection of the cyclical responses;
   selectively sending a signal to each of the identified one or more nodes of the second set of nodes, wherein the signal indicates a second context of the context-based search;
   receiving the signal at the first node of the second set of nodes wherein the signal results in a perturbance of the cyclical response by the first node; and
   signaling, based on a change to the cyclical response by the first node, a selection of the first entry as a result of the context-based search, wherein the change is based on the perturbance.

18. The method of claim 17, wherein, for each node of the subset, the node is coupled to one or more other nodes of the subset each by a respective inhibitor node.

19. The method of claim 17, wherein the perturbance of the cyclical response by the first node includes at least one of:
   an addition of one or more signal spikes to the cyclical response by the first node;
   a temporary dampening of the cyclical response by the first node;
   a temporary inversion of the cyclical response by the first node; or
   a temporary magnification of the cyclical response by the first node.

* * * * *